Sept. 22, 1970  F. O. MOODY  3,529,770
ADJUSTABLE HYDRAULIC THERMOSTATIC CONTROL WITH RELIEF
Filed Aug. 2, 1968  2 Sheets-Sheet 1

INVENTOR.
Floyd O. Moody
BY
Carl A. Stickel
ATTORNEY

Sept. 22, 1970          F. O. MOODY          3,529,770
ADJUSTABLE HYDRAULIC THERMOSTATIC CONTROL WITH RELIEF
Filed Aug. 2, 1968          2 Sheets-Sheet 2

INVENTOR.
Floyd O. Moody
BY Carl A. Stickel
ATTORNEY

United States Patent Office 3,529,770
Patented Sept. 22, 1970

3,529,770
ADJUSTABLE HYDRAULIC THERMOSTATIC CONTROL WITH RELIEF
Floyd O. Moody, Dayton, Ohio, assignor to General Motors Corporation, Detroit, Mich., a corporation of Delaware
Filed Aug. 2, 1968, Ser. No. 749,877
Int. Cl. G01k 5/32
U.S. Cl. 236—100                     5 Claims

ABSTRACT OF THE DISCLOSURE

In the preferred form, an enclosure containing a hydraulic fluid in a closed end has a rod responsive to the expansion of the fluid for operating a double throw switch or damper. An O-ring seal seals the space between the rod and the enclosure and confines the hydraulic fluid therein. This seal is normally held in place by a flanged spring retainer, normally pressed against a stop shoulder within the enclosure by a coil spring. The switch or damper is supported and adjusted by a mounting adjustably threaded to the enclosure.

---

Accurate temperature controls are very desirable in many applications. Hydraulic temperature controls can be accurate but their cost has been too high for many applications.

It is an object of this invention to provide a simple inexpensive accurate durable adjustable hydraulic temperature control having relief for excess expansion of the hydraulic fluid.

Further objects and advantages of the present invention will be apparent from the following description, reference being had to the accompanying drawings, wherein preferred embodiments of the present invention are clearly shown.

Figure 1:
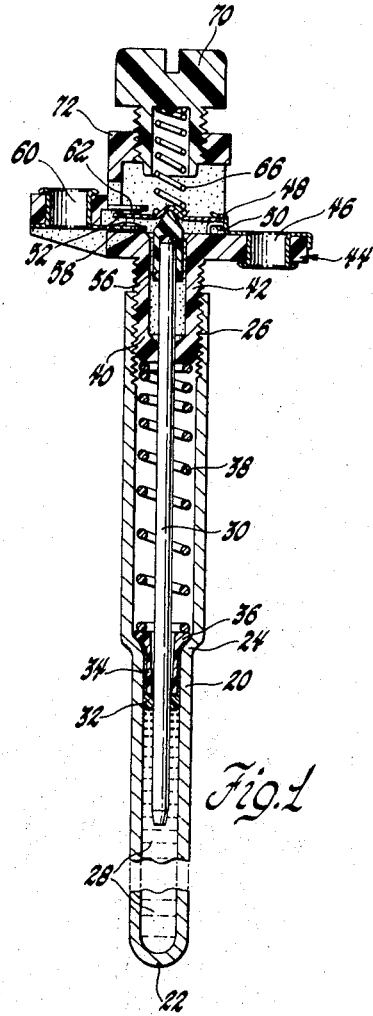
FIG. 1 is a vertical sectional view through a double throw hydraulic thermostatic switch embodying one form of my invention.
Figure 2:
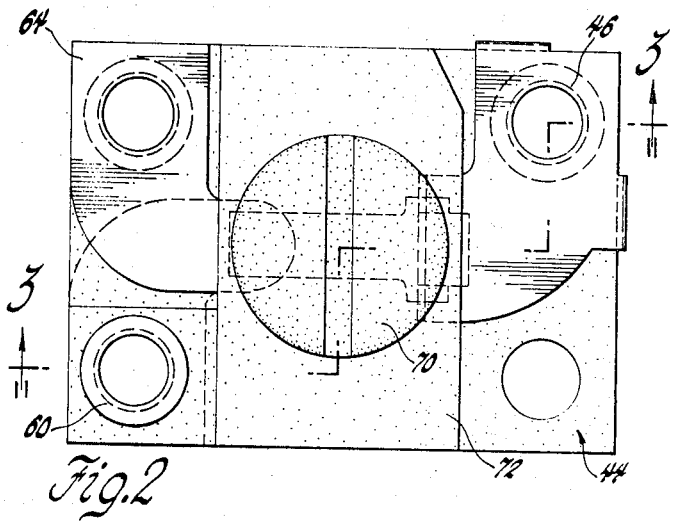
FIG. 2 is an enlarged top view of FIG. 1.
Figure 3:
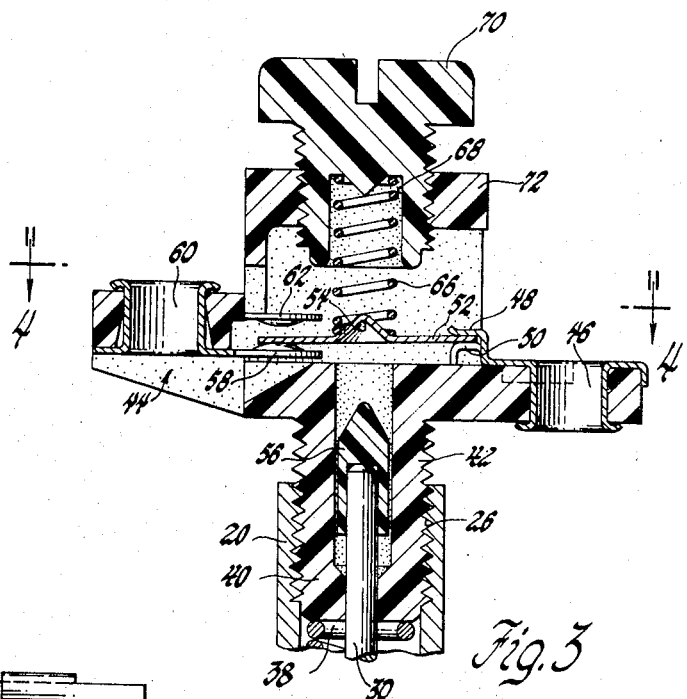
FIG. 3 is an enlarged vertical fragmentary sectional view taken along the line 3—3 of FIG. 2.
Figure 4:
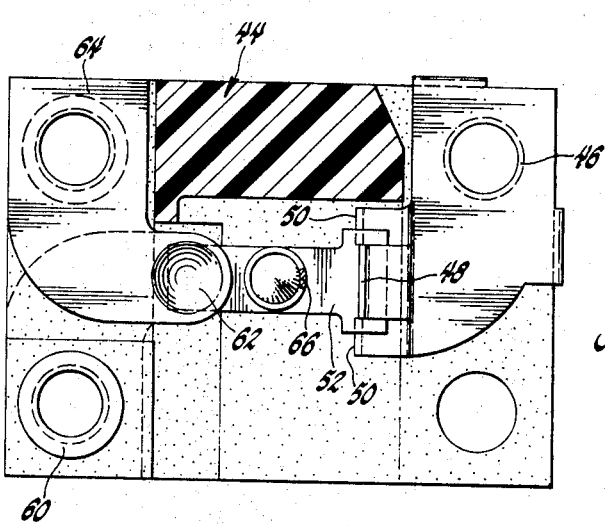
FIG. 4 is an enlarged horizontal sectional view taken along the line 4—4 of FIG. 3.

Referring now more particularly to FIGS. 1 to 4, there is shown a tube enclosure 20 which may be of aluminum, copper, brass or stainless steel, provided with a closed lower end 22, an annular shoulder 24 forming a stop and an upper open end provided with interior threads 26. The bottom of the tube 20 is filled with a thermally expansible hydraulic fluid 28 which may be a silicone mechanical fluid having a high coefficient of expansion. Within the tube 20 there is provided a coaxial actuating rod 30 which may be of stainless steel or brass. The hydraulic fluid 28 is sealed in the bottom of the tube 20 by an O-ring seal 32 which completes the enclosure and confinement of the hydraulic fluid and fits in between and seals the space between the exterior of the rod 30 and the interior of the tube 20. This coaxial O-ring seal is preferably of fluorosilicone rubber but it may be acrylonitrile butadiene, also known as Buna N. It is normally held in place by a coaxial spring retainer 34 of acetel resin which surrounds the rod 30 and has an enlarged upper end 36 which is normally held against the stop shoulder 24 by a coaxial coil spring 38. The coil spring 38 has its upper end supported by the coaxial spring retaining lower end 40 of the externally threaded sleeve 42 projecting from the bottom of the holder 44 into the internally threaded open end of the tube 20 around the rod 30. The holder 44 including its projecting sleeve 42 may be made from nylon or formaldehyde resin or polycarbonate.

The holder 44 is provided with a silver coated brass common terminal 46 having an eyelet extending through an aperture in the holder and having upper and lower prongs 48 and 50 providing notches for holding one end of the movable switch blade 52. The movable switch blade 52 is provided with a central recess 54 which is normally engaged by the nylon or polycarbonate cap 56 having a recess receiving the upper end of the rod 30 and having an upper nose or projection fitted to enter the recess 54. The opposite end of the switch member 52 is located between and adapted to be moved into engagement with either a lower contact 58 provided on a lower contact member 60 of silver coated brass which is secured in place by an extruded eyelet extending through an aperture in the mounting 44 or an upper contact 62 also of silver coated brass located directly above the contact 58. This contact 58 is provided upon an L-shaped arm of the upper contact member 64 which is likewise provided with an extruded eyelet extending through an aperture in the holder 44. These eyelets may be used to receive binding screws or bolts or other conductor terminal fastening devices. The weak return coil spring 66 is retained at its lower end by the hump formed on the opposite of the recess 54 in the contact member 52. Its upper end is received within the recess 68 in the bottom of the nylon or polycarbonate screw 70 which is threaded through the yoke 72 provided on top of the holder 44. This spring 66 may have a force of less than 2 oz. while the spring 38 may have a force of about 2 lb.

The hydraulic fluid is first put into the tube 20 after which a vacuum is drawn to remove gases therefrom. Thereafter, the O-ring 32, the retainer 34 and the spring 38 are inserted and a vacuum again drawn. Thereafter, the mounting 44 together with its contacts and all parts as well as the nylon cap 56 and the rod 30 are assembled within the tube 20 with the rod extending through the apertures of the retainer 34 and the O-ring seal 32 into the hydraulic liquid 28. The holder 44 is rotated relative to the tube enclosure 20 until the threaded portion thereof is threaded into the tube 20 a predetermined distance. At this time, the temperatures at which the switch makes and breaks contact with the upper and lower contacts is on automation. The entire thermostat is then heated in an oven maintained at about 180° F. The thermostat after being removed is rechecked to ascertain if the operating temperatures have been maintained. Thereafter, tube 20 is cooled or heated to the desired operating temperature and the holder 44 and the tube 20 are relatively rotated until the contact 52 moves away from the contact point which is more critical, which may be either the lower contact 58 or the upper contact 62. The distance between the two contacts 58 and 62 will determine the differential between the disengagement of one of the contacts and the engagement of the other. After the position of the holder 44 has been set to achieve the desired operating temperature, the threaded portion of the tube 20 may be staked to prevent further adjustment.

The volume required of the hydraulic fluid 28 will depend on the size and length of the tube enclosure 20 as well as the size and length of the rod 30 and the amount of movement required of the rod between operating temperatures. In the one specific example, the rod 30 will move 0.006 in. per degree Fahrenheit. This provides a slow make and break for the switch member 52 which minimizes arcing in alternating current circuits. Should the hydraulic fluid become overheated and the rod 30 move to its upper limit of movement, further expansion of the fluid will move the O-ring seal 32 and its retainer 34 against the force of the spring 38 to relieve the pressure and the forces. However, no hydraulic fluid will be lost until this expansion becomes so great that the O-ring seal reaches the shoulder 24 of the tube 20. Upon the cooling of the tube 20, the rod 30 and the contact member 52 will move downwardly. If the O-ring seal 32 and spring retainer 34 have been moved toward the holder 44 they likewise will return to their normal position upon the cooling of the fluid 28. However, normally neither the O-ring seal 32 nor the spring retainer 34 will move.

Figure 5:
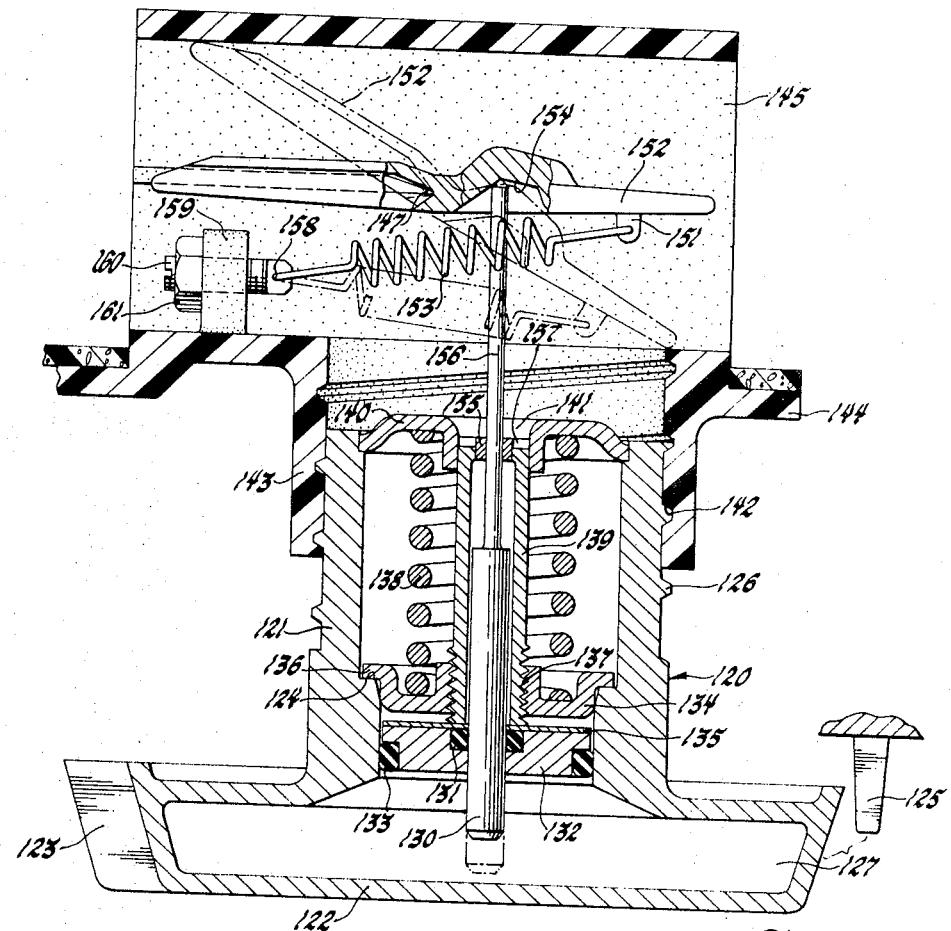
FIG. 5 is a vertical sectional view of a hydraulically operated thermostatic damper embodying a second form of my invention.
Figure 6:
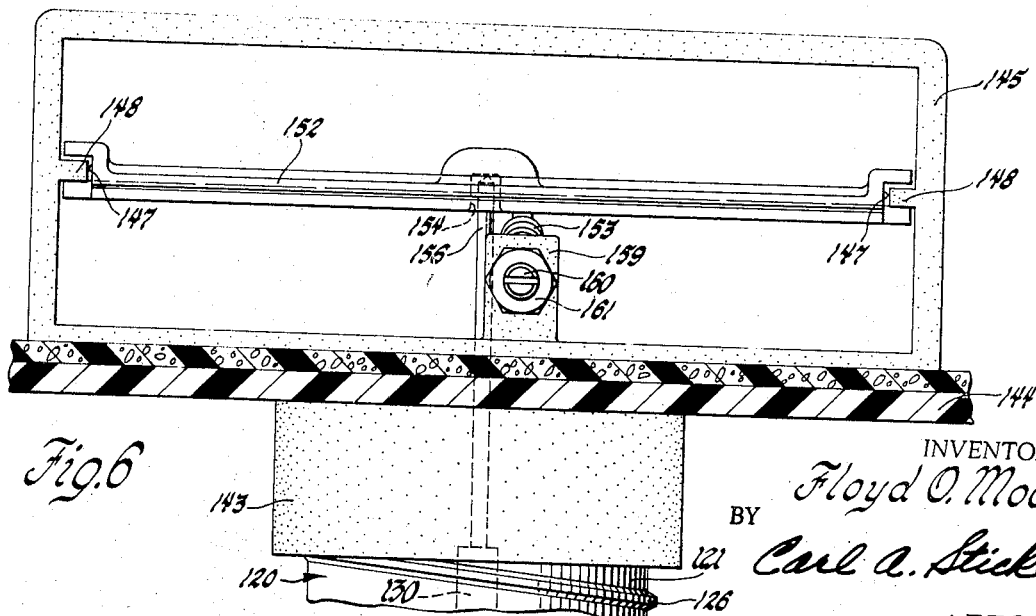
FIG. 6 is a fragmentary side view partly in section, of FIG. 5.

A similar principle is embodied in the adjustable thermostatic damper shown in FIGS. 5 and 6. In this form, the coaxial enclosure 120 has a coaxial tubular portion 121 and an enlarged coaxial closed end portion 122 which is in the shape of a hollow knob having an indicator projection 123 capable of cooperating with the external stop 125 to limit the rotation of the indicator 123 to a single turn. The closed end knob portion 122 is hollow to provide a coaxial chamber 127 into which projects the coaxial actuating rod 130 which extends through the coaxial seal member 132 having a coaxial inner O-ring seal 31 contacting the external surface of the rod 130 and a coaxial outer O-ring seal 133 contacting the coaxial inner surface of the tubular wall portion 121 of the enclosure 120. The seal 132 is in the form of a disc and has suitable coaxial annular recesses for the O-ring seals 131 and 133. It may be made of either metal or plastic and provided with a coaxial upper metal disc 135 extending over the O-ring seal 131 to hold the seal 131 in the inner annular recess.

Above the seal 132, the inner surface of the tubular portion 121 is provided with a coaxial annular stop shoulder 124 which receives the coaxial spring retainer 134 having a coaxial external flange 136 held against the stop shoulder 124 by the coaxial coil spring 138 which surrounds the rod 130 within the tubular portion 121. The spring retainer 134 is provided with an extruded threaded central aperture 137 surrounding the rod which receives the lower threaded end of a coaxial sleeve 139 which is threaded through the spring retainer 134 into engagement with the disc 135 to provide the factory adjustment for the position of the seal 132 which indirectly controls the location of the rod 130. The upper end of the sleeve 139 is held within the extruded aperture 141 in the upper seal retainer 140 which may be fastened within a recess in the top of the tubular portion 121 of the enclosure 120 by staking or soldering or cementing. If desired, the upper portion 156 of the rod 130 may be reduced in diameter and a bushing 155 may be provided between it and the adjacent top portion of the sleeve 139. The top of the sleeve 139 may be provided with notches 157 whereby it may be rotated relative to the spring retainer 134 to adjust the position of the seal 132 and consequently the actuating rod 130.

In this form the tubular portion 121 is provided with external threads 126 which are threaded into the thread grooves 142 in the lower tubular portion 143 of the damper housing 144. The damper housing 144 has an upper portion 145 in the form of a rectangular duct which connects with the tubular portion 143. On the inner sides of this upper portion there are provided a pair of knife edge pivots 148 which are adapted to receive the notches 147 provided on the opposite sides along the center line of the damper 152. The damper 152 is provided with a notch 154 for receiving the projecting upper portion 156 of the rod 130.

The damper 152 is held in engagement with the notches 147 and in engagement with the upper end portion 156 of the rod 130 by a tension type coil spring 153 having one end put through an aperture in the ear 151 on the bottom of the damper 152 to the right of the notches 147 and having the other end put through an aperture 158 in a screw 160 which extends through a boss 159 projecting within the upper portion 145 and adjusted by a nut 161. The nut 161 is turned to adjust the screw 160 and the tension of the spring 153 sufficiently that the notches 147 will always be maintained in contact with the knife edges 148. The upper portion 145 may be connected to or fitted into a duct work to control the flow of a fluid therethrough. The boss 159 may serve as a stop to limit the opening movement of the damper 152 while the closing movement of the damper will be limited by the engagement of the edges of the damper with the interior walls of the upper portion 145 as illustrated in the dot-dash position thereof.

The operating range of the damper is factory set by the position of the seal member 132 through the rotation of the sleeve 139. A limited customer's adjustment of the operating range is accomplished through the rotation of the enclosure 120 relative to the support 144. This is limited to one revolution by the engagement of the index projection 123 with the stop 125. The damper is provided with an adequate quantity of thermally expansible hydraulic fluid which may be silicon to provide accuracy at low cost without material change in calibration throughout its life. The simple adjustment of the operating range makes it applicable to a wide variety of fluid controls, especially where it is desired to control the temperature through the use of a damper.

In both forms, the O-ring seals 32, 131 are of a torus shape with an inner diameter slightly smaller than the rods 30, 130 and an outer diameter slightly larger than the adjacent cylindrical wall surfaces of the tube 20 and the seal 132. The elastomeric material of which the O-ring seals 32, 131 are made is soft and elastic so that the seals always deform and conform to the cylindrical contacting surfaces of the rods 30, 130 and the adjacent cylindrical surfaces of the tube 20 and the seal 132. The O-ring seal 133 is likewise of a torus shape and made of soft elastic elastomeric material. This O-ring seal 133 also has an inner diameter smaller than the adjacent cylindrical wall of the seal 132 and an outer diameter larger than the adjacent inner cylindrical surface of the tubular portion 121.

The seal retainer 34 is so much harder and less elastic that it does not deform like the O-ring seal 32 and has an inner diameter greater than the rod 30 and the O-ring seal 32. The outer diameter of its inner portion is smaller than the O-ring seal 32 and the adjacent cylindrical surface of the tube 20. The inner portion of the seal retainer 34 extends a substantial distance such as about twice its diameter, into the small diameter portion of the tube 20 so that ample provision is provided for excess expansion without leakage of the hydraulic fluid 28 and outward movement of the seal 32 in the small diameter portion of the tube 20 when the actuating rod 30 has been moved outwardly the maximum distance allowed by the control device. The enlarged upper portion 36 of the spring retainer 34 is in the form of a thick annular protruding heavy rim having a diameter substantially greater than the inner diameter of the smaller diameter portion of the tube 20 but slightly smaller than the inner diameter of the larger diameter portion of the tube 20 so that it will normally engage the stop shoulder 24. The material of the spring retainer 34, such as acetal resin, has a relatively low coefficient of friction when operating in contact with smooth material surfaces so that it does not impede the operation of the actuating rod 30. While acetal resin is suggested, other low friction resins may be used, if desired, such as polytetrafluoroethylene or nylon.

In operation, the surfaces contacting the O-ring seal are so much harder and less elastic than the O-ring seal 32 that the O-ring seal is always deformed by the other surfaces to maintain the seal which prevents the leakage of the hydraulic fluid. The O-ring seals 131 and 133 are similarly confined by harder and less elastic materials so that they are likewise deformed by and conform to the adjacent cylindrical and flat surfaces to provide the satisfactory seal. Because of the inelastic character of the expansion of the hydraulic fluid 28, the moderate friction of the O-ring seals is not a problem and the hydraulic fluid tends to act as a lubricant for the O-ring seals to maintain satisfactory operation without leakage. These simple elements thereby provide a satisfactory low cost reliable thermal expansion control.

While the embodiments of the invention as herein disclosed constitute preferred forms, it is to be understood that other forms might be adopted.

I claim:

1. A thermostatic control including an enclosure containing a thermally expansible fluid, an operating rod within the enclosure extending into contact with the fluid and responsive to the expansion of the fluid, wherein the improvement comprises a seal member surrounding said rod and having sealing surfaces contacting said rod and contacting said enclosure for preventing the escape of said fluid, an inner spring retainer surrounding said rod within said enclosure and having means normally bearing against said seal member, a coil spring surrounding said rod within said enclosure having an inner end bearing against said inner spring retainer, said spring being sufficiently resilient to yield to permit retraction of said retainer and seal member by force of said fluid for relieving excess expansion of the fluid, said enclosure being provided with a stop for limiting the movement of said inner spring retainer toward said fluid under the force of said spring, said enclosure also being provided with an outer spring retainer surrounding said rod and supporting the outer end of said spring, and a control device operated from one position to another by said rod.

2. A thermostatic control including an enclosure containing a thermally expansible fluid, an operating rod within the enclosure extending into contact with the fluid and responsive to the expansion of the fluid, wherein the improvement comprises a seal member surrounding said rod and having sealing surfaces contacting said rod and contacting said enclosure for preventing the escape of said fluid, an inner spring retainer surrounding said rod within said enclosure and having means normally bearing against said seal member, a spring surrrounding said rod within said enclosure having an inner end bearing against said inner spring retainer, said spring being sufficiently resilient to yield to permit retraction of said retainer and seal member by force of said fluid for relieving excess expansion of the fluid, said enclosure being provided with a stop for limiting the movement of said inner spring retainer toward said fluid under the force of said spring, said enclosure being provided with an outer mounting having common complementary helical threads in engagement with each other to provide an adjustable connection between said enclosure and said outer mounting, said outer mounting being provided with means for supporting the outer end of said coil spring, and a control device supported by said outer mounting operated by said rod from one position to another.

3. A thermostatic control including an enclosure containing a thermally expansible hydraulic liquid, an operating rod within the enclosure extending into contact with the hydraulic liquid and responsive to the expansion of the liquid, wherein the improvement comprises providing said enclosure with portions of larger and smaller cross sectional area and a shoulder between them, a sealing means within and making slidable contact with said portion of smaller cross sectional area surrounding and making slidable sealing contact with said rod, said sealing means having a sleeve portion surrounding said rod extending within said portion of small cross sectional area and being provided with a flange in the portion of larger cross sectional area for engaging said shoulder, a spring surrounding said rod within the larger portion of said enclosure having an inner end exerting force against said sealing means for normally holding said sealing means with its flange in engagement with said shoulder, said spring being sufficiently resilient to yield to permit retraction of said flange away from said shoulder by force of said liquid relieving excess expansion of the hydraulic liquid, said enclosure being provided with an outer mounting and a control device supported by said outer mounting, said control device being operably connected to said rod for operation from one position to another.

4. A thermostatic control as defined in claim 1 in which the control device is mounted upon a support, said support having an adjustable threaded connection with said enclosure.

5. A thermostatic control including an enclosure containing a thermally expansible hydraulic liquid, an operating rod within the enclosure extending into contact with the hydraulic liquid and responsive to the expansion of the liquid, wherein the improvement comprises providing said enclosure with portions of larger and smaller cross sectional area and a shoulder between them, an elastomeric seal member surrounding said rod and having inner sealing surfaces slightly smaller than said rod contacting said rod and slightly larger outer sealing surfaces than said smaller cross sectional area contacting the smaller cross sectional area of said enclosure for preventing the escape of said hydraulic liquid, an inner spring retainer having an inner sleeve portion surrounding said rod within said smaller cross sectional area of said enclosure and having an inner end portion normally bearing against said seal member, said inner sleeve portion having an aperture slightly larger than said rod and having an exterior smaller than said smaller cross sectional area of said enclosure, a spring surrounding said rod within said enclosure having an inner end bearing against said inner spring retainer for holding said inner end portion against said seal, said spring being sufficiently resilient to yield to permit retraction of said retainer and seal member by force of said liquid for relieving excess expansion of the hydraulic liquid, said inner spring retainer having an enlargement within said enclosure portion of larger cross sectional area adjoining said inner sleeve portion forming a protrusion for engaging said shoulder providing a stop for limiting the movement of said inner spring retainer toward said hydraulic liquid under the force of said spring, said enclosure being provided with an outer mounting and a control device supported by said outer mounting, said control device being located to be engaged by and operated by said rod from one position to another.

References Cited

UNITED STATES PATENTS

| 2,128,274 | 8/1938 | Vernet | 73—368.3 X |
| 2,725,458 | 11/1955 | Bremer. | |
| 3,007,029 | 10/1961 | Levine. | |
| 3,221,758 | 12/1965 | Morse | 137—15 |

WILLIAM E. WAYNER, Primary Examiner

U.S. Cl. X.R.

60—23; 73—368.4; 277—188; 337—323